United States Patent Office 3,423,405
Patented Jan. 21, 1969

3,423,405
PREPARATION OF 1,3,5(10),9(11) STEROIDS AND NOVEL INTERMEDIATES THEREOF
Alexander D. Cross, Mexico City, Mexico, assignor to Syntex Corporation, Panama, Panama, a corporation of Panama
No Drawing. Filed May 31, 1966, Ser. No. 553,679
U.S. Cl. 260—239.57
Int. Cl. C07c 173/00, 169/08
19 Claims This invention relates to a novel process for the preparation of steroids and to certain novel steroids produced as intermediates thereof.

More particularly, this invention relates to a process for the preparation of certain $\Delta^{1,3,5(10),9(11)}$ steroids from the corresponding ring A aromatic steroids. Further, this invention pertains to certain novel C–3 ethers formed as intermediates in the above process. One specifically important aspect of this invention concerns the preparation of 9(11)-dehydroestrone from estrone, utilizing the novel processes hereof, as will be more completely described hereinafter.

The novel process hereof can be illustrated by the following transformation depicting partial steroid formulas:

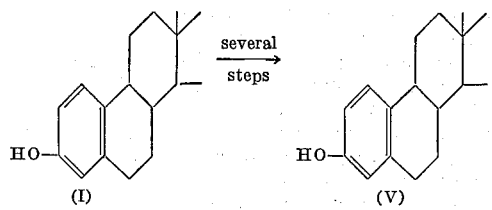

The products of this invention represented by Formula V containing the $\Delta^{1,3,5(10),9(11)}$-unsaturated system are useful as starting compounds for certain other novel processes such as is described in Ser. No. 533,877, filed Mar. 14, 1966, now abandoned. In addition, the compounds provided in accordance herewith exhibit various hormonal properties. For example, 9(11)-dehydroestrone is an estrogenic agent. Other functional groups which are known to exhibit various physiological properties can be introduced therein thus making them useful as precursors for the preparation of steroids which have demonstrated their usefulness in pharmaceutical compositions.

The following reaction scheme in which again partial steroid formulas are represented further defines the above novel transformation:

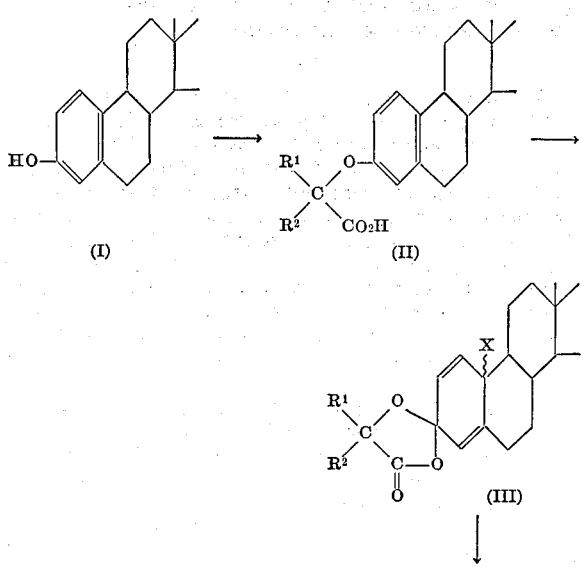

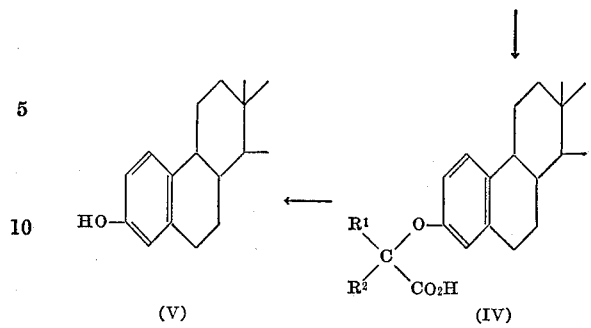

wherein each of $R^1$ and $R^2$, independent of the other, is hydrogen, (lower) alkyl of less than 6 carbon atoms such as methyl, ethyl, and propyl, cyclic hydrocarbon such as cyclohexyl, aromatic hydrocarbon such as phenyl, or when taken together with the carbon to which they are attached, cyclohexyl, and X is bromo or iodo.

The starting compounds of this invention as illustrated by Formula I above are preferably of the estrane series of steroids containing a 17-keto or 17β-acetoxy grouping; however, the process of this invention may also be practiced on steroids containing the pregnane and corticoid side chains. Those starting compounds containing a keto group, normally at C–17 or C–20, are protected before the above reactions are performed by initially forming the ketal thereof such as by treatment with ethylene glycol in benzene at reflux temperatures.

With reference to the above reaction scheme, starting compounds (I) illustrated above are treated with a solution of a trihalomethylcarbinol, notably trichloromethyldimethylcarbinol, and excess base, such as sodium hydroxide, potassium hydroxide, sodium methoxide, sodium butoxide, and the like, preferably at about 0° C., thus giving the steroidal 1,3,5(10)-trien-3-yloxy carboxylic acid derivatives (II).

The trihalomethylcarbinol referred to above is preferably prepared "in situ," that is, in the above reaction mixture through the condensation of chloroform, bromoform, and iodoform, with ketones, formaldehyde, α-branched aldehydes, straight-chain aldehydes, and substituted benzaldehydes. The preferred trichloromethyldimethylcarbinol is the condensation reaction product of acetone and chloroform and is sometimes referred to as acetone-chloroform. Examples of other suitable trihalomethylcarbinols thus prepared are trichloromethylcarbinol, tribromomethylcarbinol, trichloromethylethylcarbinol, 1-trichloromethyl-1-cyclohexanol, phenyltrichloromethylcarbinol, phenyltrichloromethylmethylcarbinol, and the like.

Thus, the above reaction involves the addition of starting steroid (I), a haloform, and a carbonyl containing compound to a solution containing excess base whereby the corresponding trihalomethylcarbinol is formed and reacted with the steroid thus giving a compound represented by Formula II above.

The conversion of compounds (II) to the 3,3-(1'-oxoethylene-1',2'-dioxy)-10-halo-$\Delta^{1,4}$ steroids (III) is executed upon treatment with an alkali metal halide perhalide notably potassium bromide perbromide (provided by a reaction combination of sodium bromide and bromine) in organic reaction medium at temperatures ranging from about —25° C. to about 50° C. and preferably about 0° C.

The latter reaction is generally conducted utilizing approximately equal molar quantities of the alkali metal halide perhalide reactant with the amount of starting steroid used. A slight excess, that is, about from 1.5 to 2.0 moles of reactant per mole of starting steroid, is preferred. Organic reaction medium for this latter reaction is satisfactorily provided from dimethylsulfoxide or other dialkylsulfoxide, either with or without the presence of water. Other suitable organic solvents are ethers, for example, dioxane, tetrahydrofuran, and the like; ketones, for example, acetone, methyl ethyl ketone, and the like; formamides, for example, formamide itself, dimethylformamide, acetamide, and the like; and glycols, for example, the dimethyl ether of diethyleneglycol(diglyme), the dimethyl ether of triethyleneglycol(triglyme), and the like. Most useful of the above solvents are those which exhibit substantial miscibility with water such as acetone, tetrahydrofuran, and so forth. A solvent is chosen which renders the reaction medium in the liquid phase at the temperature employed without the necessity of special equipment and/or techniques.

Among the useful alkali metal halide perhalide reactants for the above process are included potassium bromide perbromide, potassium iodide perbromide, potassium iodide periodide, sodium bromide perchloride, potassium bromide perchloride, and the like. In this embodiment, halide is preferably bromo or iodo thus giving the corresponding 10-bromo and 10-iodo derivatives.

Thereafter, ring opening of the 3,3-dioxy group of compounds (III), accompanied by concomitant dehydrohalogenation, is realized upon treatment thereof with an alkali alkaline earth metal salt, notably a calcium salt such as calcium carbonate in organic solution such as N,N-dimethylacetamide, thus providing the steroidal $\Delta^{1,3,5(10),9(11)}$-tetraen-3-yloxy carboxylic acid compound (IV). Treatment thereof, sufficient to remove the 3-carboxylic acid grouping, such as with lead tetraacetate in organic solvent, e.g., methylene chloride, benzene, dioxane, and the like, giving a solution containing a mixture of the corresponding 3-ethyleneoxy and 3-(α-acetoxyalkyloxy) derivatives which can be separated and removed via conventional means, followed by mild acid hydrolysis thereof such as is provided by dilute hydrochloric acid or like acid in organic solvent, e.g., methanol and the like, results in the product 3-hydroxy compound (V). The latter acid hydrolysis also removes ketal protecting groups which may be present in other parts of the molecule thus restoring the corresponding keto functions. In the instance that compound (IV) is the isobutyric acid compound, the intermediate derivatives formed after lead tetraacetate treatment are the corresponding 3-isopropenyloxy and 3-(2'-acetoxyisopropanyloxy) derivatives.

Alternatively, the 3-carboxylic acid grouping of compounds (IV) can be removed by electrolysis utilizing platinum electrodes in an anhydrous methanol solution containing, for example, sodium methoxide followed again by mild acid hydrolysis as described above. Another method of removing the acid group involves treating the compound with reducing agent such as lithium aluminum hydride and thereafter reacting the reduced derivative with thionyl chloride, triphenylphosphine dibromide, and the like, followed by zinc metal treatment thus giving the corresponding 3-hydroxy derivative.

Those compounds represented by Formula III above are particularly valuable novel intermediates, both for the instantly contemplated process and to certain other syntheses of steroidal compounds. Such compounds may be more completely represented by the following formula:

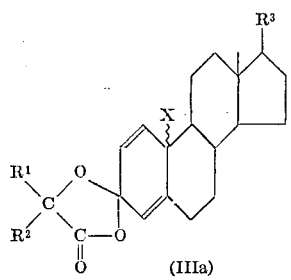

(IIIa)

wherein each of $R^1$, $R^2$, and X is as hereinbefore defined and $R^3$ is one of groups

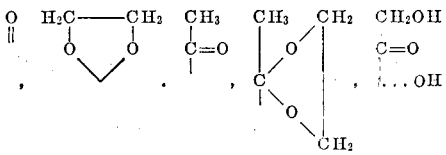

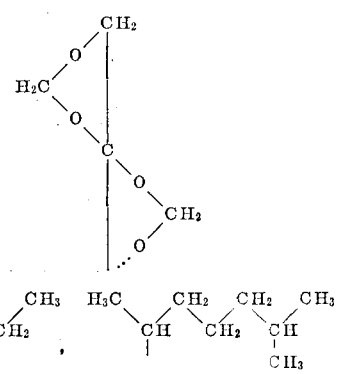

Compounds (IIIa), in addition to their usefulness as intermediates for the process of this invention, are similarly useful as biologically active compounds as described hereinabove for product compounds (V).

The above groups defined by $R^3$ above are preferably present in starting steroids (I). The free 17-keto, 20-keto, and 17α,21-dihydroxy-20-keto system, as defined in $R^3$ above, are provided upon conventional acid hydrolysis of the corresponding positionally protected compounds. However, when the above compounds are utilized as intermediates hereof and are further treated to give compounds (IV) as illustrated above, these protecting groups are preferably retained.

The following examples serve to illustrate the manner by which this invention can be practiced, however they should not be construed as limitations upon the overall scope hereof.

EXAMPLE 1

Part A

A mixture of 1 g. of estrone, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 17,17-ethylenedioxyestrone-[17,17-ethylenedioxyestra-1,3,5(10)-trien-3β-ol] which is recrystallized from acetone:hexane.

Part B

A solution of 8 g. of 17,17-ethylenedioxyestra-1,3,5-(10)-trien-3β-ol, 6.4 g. of powdered sodium hydroxide in 120 ml. of acetone is stirred in ice and a solution of 5 g. of chloroform in 25 ml. of acetone is added over a period of 30 minutes. The resultant mixture is stirred in ice an additional hour, allowed to warm to room temperature for one hour, and refluxed for four hours. The nearly solid mixture is poured into 800 ml. of water, stirred for 20 minutes with activated charcoal, and filtered. The filtrate is extracted with ether and the ethereal extract is washed with water and evaporated in vacuum to give α-(17,17-ethylenedioxyestra - 1,3,5(10) - trien-3-yloxy)-isobutyric acid.

The aqueous phase can be acidified and further extracted with ether and the ether extracts treated as described above to give additional product. The combined product from each procedure can be further purified upon crystallization from ether:hexane.

A mixture of 500 ml. of α-(17,17-ethylenedioxyestra-1,3,5(10)-trien-3-yloxy)-isobutyric acid, 25 ml. each of dimethylsulfoxide and water, and 1.25 g. of potassium bicarbonate is stirred in ice. A solution containing 8 g. of bromine and 12 g. of potassium bromide in 30 ml. of water is prepared and 0.9 ml. of this solution is added dropwise to the above mixture with stirring. After all of the bromine solution has been added, the reaction mixture is poured into 250 ml. of water, extracted with ether, and the ether extracts washed successively with dilute sodium bicarbonate and water, dried over sodium sulfate and evaporated in vacuum below about 40° C. giving 3,3-(1'-oxo - 2' - methylpropylene - 1',2'-dioxy)-10-bromo-17,17-ethylenedioxyestra-1,4-diene.

Two grams of the thus prepared 3,3-(1'-oxo-2'-methylpropylene - 1',2' - dioxy)-10-bromo-17,17-ethylenedioxyestra-1,4-diene are dissolved in 200 ml. of N,N-dimethylacetamide containing 5 g. of calcium carbonate and the mixture is stirred vigorously on the steam bath for 4 hours. After this time, the reaction mixture is poured into water, orthophosphoric acid is added to pH 2, and the mixture is extracted with ether. The ethereal extracts are washed until the washings are neutral, dried over sodium sulfate, and evaporated in vacuum to give α-(17,17-ethylenedioxyestra-1,3,5(10),9(11)-tetraen-3-yloxyl)-isobutyric acid.

A solution of 1 g. of α(17,17-ethylenedioxyestra-1,3,5-(10),9(11)-tetraen-3-yloxy)-isobutyric acid in 25 ml. of dioxane containing 2 molar equivalents of lead tetraacetate is refluxed for about 18 hours to give a mixture of the 3-isopropenyloxy- and 3-(2'-acetoxyisopropanyloxy)-17,-17 - ethylenedioxyestra-1,3,5(10),9(11)-tetraene derivatives which can be separated and recovered by chromatography. A 5% aqueous solution of sulfuric acid in methanol is added to the reaction solution containing the compound mixture and the resultant mixture is refluxed for 20 minutes. After cooling, the reaction mixture is filtered and the organic filtrate evaporated to give estra-1,3,5-(10),9(11)-tetraen-3-ol-17-one which can be further purified upon recrystallization from methanol.

Part C

Similarly, by following the procedures outlined in Part B above, starting with 17β-acetoxyestra-1,3,5(10)-traen-3β-ol, there is obtained 17β-acetoxyestra-1,3,5(10),9(11)-tetraen-3β-ol therefrom. Thereafter, the acetoxy group is conventionally removed with base treatment to give the corrseponding 17β-hydroxy steroid which is oxidized with chromic trioxide to the 17-keto steroid.

The substitution of the appropriate quantities of iodine for bromine and potassium iodide for potassium bromide in the procedure set forth in paragraph 3 of this example (Part B) gives as a final product therefrom, 3,3-(1'-oxo-2' - methylpropylene-1',2'-dioxy)-10-iodo-17,17-ethylenedioxyestra-1,4-diene.

Similarly, the appropriate quantities of lithium chloride, lithium carbonate, and calcium bicarbonate are substituted for calcium carbonate in the procedure set forth in the fourth paragraph of Part B of this example with similar results.

The following procedure can be substituted for the procedure described in paragraph 5 of this example (Part B) with similar results:

To a solution of 1 g. of α-(17,17-ethylenedioxyestra-1,3,5(10),9(11)-tetraen-3-yloxy)-isobutyric acid in 50 ml. of anhydrous methanol is added sufficient sodium methoxide to neutralize 5% of the steroid. The resultant mixture is electrolyzed with platinum electrodes in the anhydrous medium using between 1 and 2 amperes current until the acid is no longer detected by thin layer chromatography. Thereafter, an excess of 5% hydrochloric acid is added and the mixture is refluxed for 20 minutes. After cooling, the reaction mixture is filtered and the organic filtrate evaporated to give estra-1,3,5(10),9(11)-tetraen-3-ol-17-one which can be further purified upon recrystallization from methanol.

EXAMPLE 2

The procedure outlined in Part A of Example 1 above is performed utilizing 19-norpregna-1,3,5-(10)-trien-3β-ol-20-one to give 20,20-ethylenedioxy-19-norpregna-1,3,5(10)-trien-3β-ol. This compound is then treated according to the procedures of Part B of Example 1 to give 19-norpregna-1,3,5(10),9(11)-tetraen-3β-ol-20-one.

Similarly, by following the procedure of Part B of Example 1 on 17α,20;20,21-bismethylenedioxy-19-norpregna-1,3,5(10)-trien-3β-ol there is obtained 17α,20;20, 21-bismethylenedioxy-19 - norpregna - 1,3,5(10),9(11)-tetraen-3β-ol which may be further treated as follows.

A suspension of 1 g. of 17α,20;20,21-bismethylenedioxy-19-norpregna-1,3,5(10),9(11)-tetraen-3β-ol in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane: ethyl acetate to yield 19-norpregna-1,3,5(10),9(11)-tetraene-3β,17α,21-triol-20-one which may be further purified through recrystallization from isopropanol.

EXAMPLE 3

The procedure outlined in Example 1 (Part B) above is repeated utilizing 19-norchola-1,3,5(10)-traen-3β-ol as starting steroid to give as a final product therefrom 19-norchola-1,3,5(10),9(11)-tetraen-3β-ol.

Similarly, 19-norcholesta - 1,3,5(10),9(11)-tetraen-3β-ol is thereby prepared from 9-norcholesta-1,3,5(10)-traen-3β-ol.

EXAMPLE 4

The procedure of the first paragraph of Part B of Example 1 wherein trichloromethyldimethylcarbinol is prepared "in situ" from a chlofrom-acetone mixture is repeated, substituting in lieu of acetone in the above described mixture the compounds listed under I below, thus giving the "in situ" carbinols listed under II below to provide as reaction products of the procedure the respective compounds listed under III below.

I formaldehyde  cyclohexanone
propionaldehyde  benzaldehyde

II trichloromethanolcarbinol
trichloromethylethylcarbinol
1-trichloromethyl-1-cyclohexanol
phenyltrichloromethylcarbinol

III

α-(17,17-ethylenedioxyestra-1,3,5(10)-trien-3-yloxy)-acetic acid
α-(17,17-ethylenedioxyestra-1,3,5(10)-trien-3-yloxy)-n-butyric acid
1-(17,17-ethylenedioxyestra-1,3,5(10)-trien-3-yloxy)-cyclohexane-1-oic acid
α-(17,17-ethylenedioxyestra-1,3,5(10)-trien-3-yloxy)-α-phenylacetic acid.

Similarly, by substituting the equivalent amounts of bromoform in lieu of chloroform therein, the corresponding tribromocarbinols are prepared "in situ." In addition, the substitute of an equivalent amount of potassium hydroxide in lieu of sodium hydroxide therein affords similar results in each instance.

EXAMPLE 5

The procedure set forth in the third paragraph of Part B of Example 1 above is repeated utilizing as starting steroids those compounds listed under (III) in Example 4, thus respectively giving 3,3-(1'-oxoethylene-1',2'-dioxy)-10 - bromo - 17,17 - ethylenedioxyestra-1,4-diene, 3,3-(1'-oxo-n-butylene-1',2'-dioxy)-10-bromo - 17, 17-ethylenedioxyestra - 1,4-diene, 3,3-(1'-oxo-2',2'-cyclohexylethylene-1',2'-dioxy)-10-bromo - 17,17 - ethylenedioxyestra-1,4-diene, and 3,3-(1'-oxo-2'-phenylethylene-1', 2'-dioxy)-10-bromo - 17,17 - ethylenedioxyestra - 1,4-diene.

Similarly, the corresponding 3,3-dioxy steroids of the other compounds prepared in accordance with the process of this invention as illustrated by Examples 2 and 3 above are prepared.

The corresponding 10-iodo derivatives of the above compounds are prepared by following the procedure set forth in the second paragraph of Part C of Example 1 hereof.

EXAMPLE 6

A mixture of 0.5 g. of 3,3-(1'-oxo-2'-methylpropylene-1',2'-dioxy)-10-bromo - 17,17 - ethylenedioxyestra - 1,4-diene in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate and evaporated to dryness, to yield 3,3-(1'-oxo-2'-methylpropylene - 1',2'-dioxy)-10-bromoestra-1,4-dien-17-one which can be recrystallized from acetone:hexane.

Similarly, the following compounds are respectively prepared from the corresponding compounds listed in Example 5 above:

3,3-(1'-oxoethylene-1',2'-dioxy)-10-bromoestra-1,4-dien-17-one,
3,3-(1'-oxo-n-butylene-1',2'-dioxy)-10-bromoestra-1,4-dien-17-one,
3,3-(1'-oxo-2',2'-cyclohexylethylene-1',2'-dioxy)-10-bromoestra-1,4-dien-17-one, and
3,3-(1'-oxo-2'-phenylethylene-1',2'-dioxy)-10-bromo-estra-1,4-dien-17-one.

The corresponding intermediates of the procedures described in Example 2 above, namely 3,3-(1'-oxo-2'-methylpropylene-1',2'-dioxy) - 10 - bromo-20,20-ethylenedioxy-19-norpregna-1,4-diene, 3,3-(1'-oxo-2'-methylpropylene-1',2'-dioxy) - 10 - bromo - 17α,20;20,21-bis-methylenedioxy-19-norpregna-1,4-diene can be treated with acid as described above to give the corresponding compounds containing the free 20-keto and 17α,21-dihydroxy-20-keto functions, respectively. Similarly, 3,3-(1'-oxo-2'-methylpropylene - 1',2' - dioxy) - 10-bromo-19-norchola-1,4-diene, and 3,3-(1'-oxo-2'-methylpropylene-1',2'-dioxy)-10-bromo-19 - norcholesta-1,4-diene can be isolated from the procedure illustrated in Example 3.

By using the alternative procedures described above, the corresponding 10-iodo derivatives of the above compounds are prepared as well as the other corresponding 3,3-dioxy derivatives set forth in Example 5 hereof.

What is claimed is:
1. A process which comprises
  (a) treating a 3-hydroxy ring A aromatic steroid with a trihalomethylcarbinol in the presence of base to give a steroidal 1,3,5(10)-trien-3-yloxy carboxylic acid derivative,
  (b) converting this derivative to the corresponding 3,3-(1'-oxoethylene-1',2'-dioxy)-10-halo-Δ¹,⁴ steroid with an alkali metal halide perhalide in which halo is bromo or iodo,
  (c) dehydrohalogenating this steroid with an alkali or alkaline earth metal salt in organic solution to give the steroidal 1,3,5(10),9(11)-tetraen-3-yloxy carboxylic acid compound, and
  (d) removing the 3-(α-hydroxy carboxylic acid)-ether group to give the product 3-hydroxy-Δ¹,³,⁵(¹⁰),⁹(¹¹)-tetraene steroid.

2. The process of claim 1 wherein in part (a) the 3-hydroxy ring A aromatic steroid is treated with a mixture of powdered sodium hydroxide and chloroform at about 0° C. to give an α-(1,3,5(10)-trien-3-yloxy)-isobutyric acid derivative.

3. The process of claim 1 wherein the trihalomethylcarbinol is trichloromethyldimethylcarbinol thus giving in part (a) thereof an α-(1,3,5(10)-trien-3-yloxy)-isobutyric acid derivative and in part (b) thereof a 3,3-,1'-oxo-2'-methyl-propylene-1',2'-dioxy)-10-bromo-Δ¹,⁴ steroid.

4. The process of claim 1 wherein in part (b) the alkali metal halide perhalide is potassium bromide perbromide.

5. The process of claim 1 wherein in part (b) the alkali metal halide perhalide is potassium iodide periodide.

6. The process of claim 1 wherein in part (c) the dehydrohalogenation is performed with calcium carbonate.

7. The process of claim 1 wherein in part (d) the 3-(α-hydroxy carboxylic acid)-ether group is removed upon treatment with lead tetraacetate followed by acid hydrolysis.

8. The process of claim 1 wherein estrone is converted to 9(11)-dehydroestrone.

9. A process which comprises
  (a) treating a 3-hydroxy ring A aromatic steroid with a trihalomethylcarbinol in the presence of base to give a steroidal 1,3,5(10)-trien-3-yloxy carboxylic acid derivative, and
  (b) converting this derivative to the corresponding 3,3-(1'-oxoethylene-1',2'-dioxy)-10-halo-Δ¹,⁴ steroid with an alkali metal halide perhalide in which halo is bromo or iodo.

10. The process of claim 9 wherein the trihalomethylcarbinol is trichloromethyldimethylcarbinol thus giving in part (a) thereof an α-(1,3,5(10)-trien-3-yloxy)-isobutyric acid derivative and the alkali metal halide perhalide is potassium bromide perbromide thus giving in (b) a 3,3-(1'-oxo-2'-methyl-propylene-1,2-dioxy)-10-bromo-Δ¹,⁴ steroid.

11. The process of claim 10 wherein 3,3-(1'-oxo-2'-methylpropylene - 1',2' - dioxy) - 10 - bromo - 17,17-ethylenedioxy-estra-1,4-diene is prepared from 17,17-ethylenedioxyestrone.

12. Steroids of the formula:

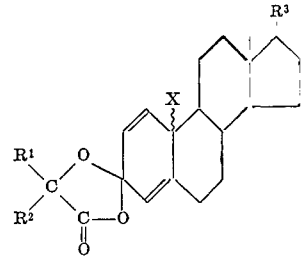

wherein each of $R^1$ and $R^2$ is hydrogen, (lower)alkyl, cyclic hydrocarbon, aromatic hydrocarbon, or when taken together with the carbon to which they are attached cyclohexyl; X is bromo or iodo; and $R^3$ is one of groups

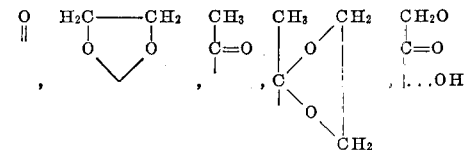

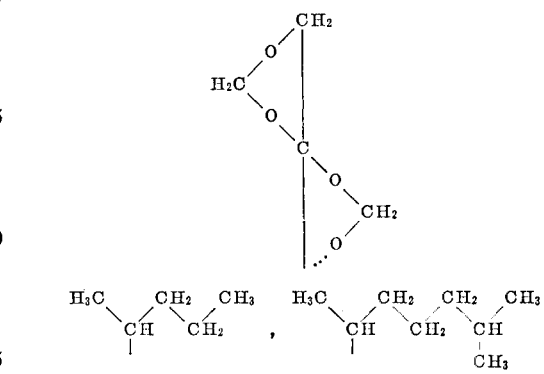

13. Steroids of claim 12 wherein X is bromo.

14. Steroids of claim 13 wherein each of $R^1$ and $R^2$ is hydrogen.

15. Steroids of claim 13 wherein each of $R^1$ and $R^2$ is methyl.

16. The steroid of claim 13 wherein each of $R^1$ and $R^2$ is methyl and $R^3$ is the group $$\overset{O}{\underset{}{\|}}$$

17. The steroid of claim 13 wherein each of $R^1$ and $R^2$ is methyl and $R^3$ is the group

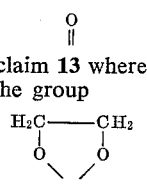

18. The steroid of claim 13 wherein each of $R^1$ and $R^2$ is methyl and $R^3$ is the group $$\begin{array}{c} CH_3 \\ | \\ C=O \\ | \end{array}$$

19. The steroid of claim 13 wherein each of $R^1$ and $R^2$ is methyl and $R^3$ is the group $$\begin{array}{c} CH_2OH \\ | \\ C=O \\ | \dots OH \end{array}$$

References Cited

UNITED STATES PATENTS 2,963,491   12/1960   Galimberti et al.

HENRY A. FRENCH, *Primary Examiner.*

U.S. Cl. X.R.

260—397.4, 397.45, 397.5, 999

UNITED STATES PATENT OFFICE
CERTIFICATE OF CORRECTION

Patent No. 3,423,405　　　　　　　　Dated January 21, 1969

Inventor(s) ALEXANDER D. CROSS

It is certified that error appears in the above-identified patent and that said Letters Patent are hereby corrected as shown below:

Column 2, in both Formulas IV and V, that portion of each formula reading

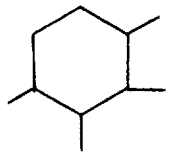　should read　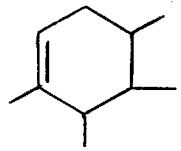

Column 5, line 19, "are washed" should read -- are washed with water --. Column 5, line 22, the portion of the formula reading "yloxyl" should read -- yloxy --. Column 8, line 55, the partial formula at the extreme right reading

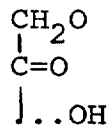　should read　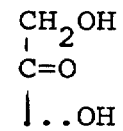

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents